(12) United States Patent
Utsunomiya et al.

(10) Patent No.: US 7,934,245 B1
(45) Date of Patent: Apr. 26, 2011

(54) AUDIO AND/OR VIDEO SIGNAL TRANSMISSION SYSTEM, TRANSMITTING APPARATUS AND RECEIVING APPARATUS THEREOF

(75) Inventors: Hiroshi Utsunomiya, Chiba (JP); Futoshi Kaibuki, Tokyo (JP); Satoshi Kobayashi, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/534,178

(22) Filed: Mar. 24, 2000

(30) Foreign Application Priority Data

Mar. 26, 1999 (JP) .................................... 11-084329

(51) Int. Cl.
*H04N 7/173* (2006.01)
(52) U.S. Cl. .............. 725/117; 725/48; 725/49; 725/59; 725/133; 725/153; 348/555; 348/556; 348/558
(58) Field of Classification Search .............. 725/48–49, 725/54, 59, 133, 141, 153, 37–41, 43, 117; 348/555, 556, 558, 554, 569, 706, 710
See application file for complete search history.

(56) References Cited

U.S. PATENT DOCUMENTS

| | | | |
|---|---|---|---|
| 5,182,642 A | 1/1993 | Gersdorff et al. ............. | 358/133 |
| 5,355,162 A * | 10/1994 | Yazolino et al. ............. | 725/116 |
| 5,371,553 A * | 12/1994 | Kawamura et al. ............. | 725/59 |
| 5,402,177 A * | 3/1995 | Maeshima et al. ............ | 348/476 |
| 5,579,308 A * | 11/1996 | Humpleman .................. | 725/80 |
| 5,629,739 A * | 5/1997 | Dougherty .................... | 348/486 |
| 5,649,171 A * | 7/1997 | Craven et al. .................. | 703/23 |
| 5,847,771 A | 12/1998 | Cloutier et al. ............... | 348/564 |
| 5,940,387 A * | 8/1999 | Humpleman .................. | 370/487 |
| 6,137,539 A * | 10/2000 | Lownes et al. .................. | 725/37 |
| 6,285,819 B1 * | 9/2001 | Jeong .............................. | 386/46 |
| 6,292,618 B1 * | 9/2001 | Ohara et al. .................... | 386/46 |
| 6,314,569 B1 * | 11/2001 | Chernock et al. ............... | 725/37 |
| 6,421,094 B1 * | 7/2002 | Han .............................. | 348/569 |
| 6,510,484 B1 * | 1/2003 | Kim et al. ...................... | 710/314 |
| 6,594,825 B1 * | 7/2003 | Goldschmidt Iki et al. .... | 725/53 |

FOREIGN PATENT DOCUMENTS

JP  09-130688 A  5/1997

(Continued)

OTHER PUBLICATIONS

Office Action from Japanese Application No. 11-084329, dated Jul. 13, 2010.

*Primary Examiner* — Christopher Kelley
*Assistant Examiner* — Sahar A Baig
(74) *Attorney, Agent, or Firm* — Lerner, David, Littenberg, Krumholz & Mentlik, LLP

(57) ABSTRACT

In order to accurately display information on the format of different signals from respective different signal source apparatuses as an image, the output signals of analog signal sources are supplied through an interface, signal lines and other interfaces to an analog signal processing circuit. Also, output signals of digital signal sources and output signals of information generating circuits are synthesized by multiplexers and supplied to a demultiplexer through interfaces, buses and an interface. The signals from the separated signal sources are processed in a digital signal processing circuit. The signals from the separated generating circuits are supplied to an information processing circuit, so that an image corresponding to the information indicating the format of the apparatus and/or the output signal is formed, and is synthesized with the signals from the signal processing circuits to be supplied to a monitor.

21 Claims, 6 Drawing Sheets

FOREIGN PATENT DOCUMENTS

| | | |
|---|---|---|
| JP | 09-149325 A | 6/1997 |
| JP | 09186969 A | 7/1997 |
| JP | 09-326799 A | 12/1997 |
| JP | 10-285664 A | 10/1998 |
| JP | 10-308797 A | 11/1998 |
| JP | 10334593 A | 12/1998 |
| JP | 11-055297 A | 2/1999 |
| JP | 11-073729 | 3/1999 |
| WO | 9212599 | 7/1992 |
| WO | WO9212599 | 7/1992 |
| WO | 9501058 | 1/1995 |
| WO | WO 9859282 A2 * | 12/1998 |

* cited by examiner

FIG. 4A

| data_length | | tag | channel | tcode | sy |
|---|---|---|---|---|---|
| header_CRC | | | | | |
| data_field | | | | | |
| pad_field | | | | | |
| data_CRC | | | | | |

FIG. 4B

| destination_ID | tl | rt | tcode | pri |
|---|---|---|---|---|
| source_ID | | | | |
| destination_offset | | | | |
| quadlet_data | | | | |
| header_CRC | | | | |

FIG. 4C

| destination_ID | tl | rt | tcode | pri |
|---|---|---|---|---|
| source_ID | | | | |
| destination_offset | | | | |
| data_length | extended_tcode | | | |
| header_CRC | | | | |
| data_field | | | | |
| pad_field | | | | |
| data_CRC | | | | |

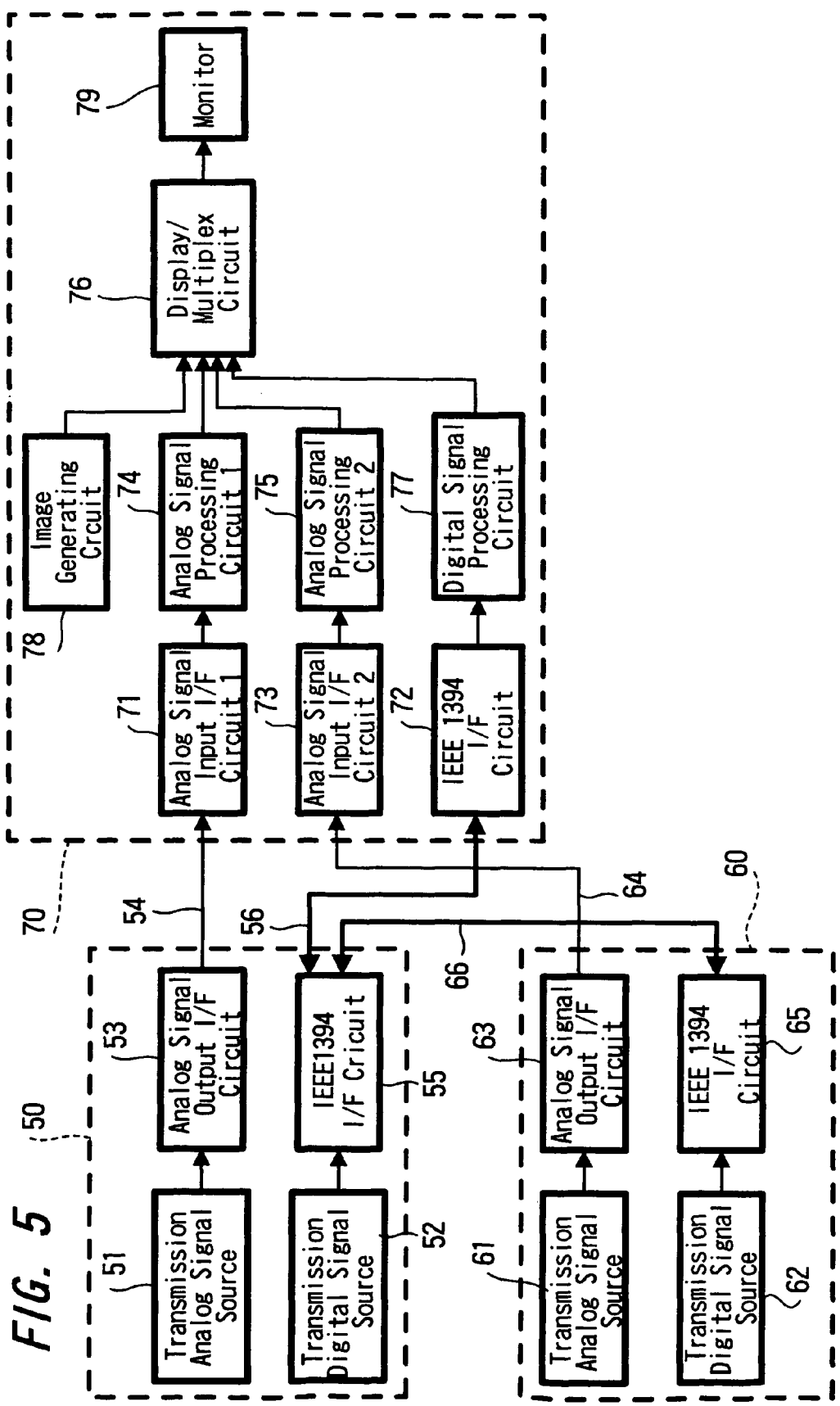

AUDIO AND/OR VIDEO SIGNAL TRANSMISSION SYSTEM, TRANSMITTING APPARATUS AND RECEIVING APPARATUS THEREOF

BACKGROUND OF THE INVENTION

1. Field of the Invention

The present invention relates to an audio and/or video signal transmission system suitably used for transmitting the audio signal and the video signal having signals of analog and digital formats in coexistence, and a transmitting apparatus and a receiving apparatus thereof. More in particular, in the case where the audio and video signals of analog and digital formats in coexistence are transmitted from single equipment, the invention is intended for superior display with any of the two types of signals.

2. Description of the Related Art

As an audio or video signal format, a digital format has conventionally been widely used in addition to the analog format. Specifically, such an audio and video signal of digital format are used for recording/reproduction apparatuses such as the video tape recorder and the disk player of digital format or the broadcasting system using the satellite wave or terrestrial wave of digital format.

In the conventional recording/reproduction apparatus and the broadcast receiving apparatus of digital format described above, the reproduction signal and the receive signal of digital format are D/A converted in the equipment and produced as audio and video signals of analog type. The audio and video signals of digital type, however, are more advantageously transmitted in terms of the signal deterioration or the like.

A means for transmitting the audio and video signals of digital format as digital signals uses a format prescribed in IEEE1394, for example. Specifically, in the prescribed format, as shown in FIG. 3, for example, a sync signal (cycle start) is provided for a predetermined period (125 µs). Between these sync signals, an arbitrary number of signal channels (1 to n) called the isochronous packets are inserted.

The isochronous packet has a configuration as shown by A in FIG. 4, for example. Each line of the packet represents one quadlet (four bytes=32 bits), and the first two bytes of the first line of the packet has a value (data length) indicating the length of the following data field. The last two bytes on the first line, on the other hand, has such data as a value (tag) indicating the packet format, a value (channel) indicating the channel number, a value (tcode) indicating the packet identification and a value (sy) used for synchronization.

The first line of this isochronous packet is considered the first head area. Further, the second line has an error correction code (header CRC) for the data in the first header area on the first line described above. Third and subsequent lines of this isochronous packet have the aforementioned data of audio and video signals transmitted over the range indicated by the value (data length) described above. Also, the last line has an error correction code (data CRC) for the data transmitted in the third and subsequent lines.

The audio and video signal data may be transmitted in segments of one, two, four or eight packets as required. In such a case, the temporal data indicating the chronological order for restoring the packets thus segmented are transmitted together with the data of the audio and video signals. Specifically, the first line (third line of the packet) of the data of the audio and video signal transmitted has a second header area, in which the temporal data, etc. are transmitted.

Further, a transmission unit for the control information called the asynchronous packet is arranged between the synch signals described above in the period remaining after transmission of the isochronous packet. The aforementioned sync signals are also transmitted in the configuration of the asynchronous packet. In accordance with the control signal transmitted in this asynchronous packet, the audio and video signals are transmitted between arbitrary units using an arbitrary channel of the isochronous packet.

Specifically, in B of FIG. 4, for example, a configuration of an asynchronous packet is shown for writing control information (data) of one quadlet, for example, in the desired memory or register of an arbitrary apparatus. One line of this packet represents one quadlet, and the first two bytes of the first line contain the recognition code (destination ID) for the destination (write destination) apparatus. The first two bytes on the second line, on the other hand, has a recognition code (source ID) for the source apparatus. These recognition codes (ID) are preset for each apparatus at the time of constructing the system, for example.

The last two bytes of the first line include a label (tl) indicating the series of control status (transaction), a code (rt) indicating the retransmission status, a code (tcode) indicating the type of the packet, and a value (pri) indicating the order of priority. Further, the last two bytes of the second line and the third line include an address (destination offset) such as a memory of the destination and the 4-byte data written on the fourth line. The fifth line, on the other hand, includes the error correction code (header CRC) for each data on the first to fourth lines.

Also, in C of FIG. 4, a configuration of the asynchronous packet for writing control information (data) of at least 1 quadlet into an arbitrary apparatus. The configuration of the first to third lines is the same as that shown in B of FIG. 4. The first two bytes of the fourth line include a value (data length) indicating the length of the following data area, and the last two bytes contain a code (extended tcode) indicating the extended control status (transaction). The fifth line includes an error correction code (header CRC) for each data on the first to fourth lines.

Further, the sixth and subsequent lines include data such as arbitrary control information of at least one quadlet over the range indicated by the aforementioned value (data length). Also, the last line includes the error correction code (data CRC) for the data transmitted on and subsequent to the sixth line. Using these asynchronous packets, the required control information, etc. are written into an address of a predetermined memory or register of the desired apparatus thereby to control the operation or the like of the particular apparatus.

By the way, the asynchronous packet has other predetermined formats of a read request or read response for one quadlet or data of one quadlet, which are not related directly to this application and therefore will not be described. The aforementioned asynchronous packet of the sync signal (cycle start) includes a cycle time code (a value of the timer register of a reference apparatus) in the packet structure of B of FIG. 4, for example.

The provision of this transmission means makes it possible to connect the recording/reproduction apparatus or a broadcast receiving apparatus of digital format described above and an apparatus such as a monitor receiver having an input means of digital format through a bus line. These apparatuses thus can be controlled between each other. By this control operation, arbitrary audio and video signals are transmitted using an arbitrary channel of the isochronous packet between these apparatuses.

SUMMARY OF THE INVENTION

Some video tape recorders of digital format that have been proposed may record signals of analog and digital formats in coexistence on the same recording tape (recording medium).

Also, in the receiving apparatus of the satellite wave or terrestrial wave in digital format, there is a period during which the broadcast in digital format and the broadcast in analog format coexist. The recording/reproduction apparatus or the broadcast receiving apparatus described above includes analog output means in addition to digital input/output means, so that signals both in analog and digital formats are output.

Specifically, FIG. 5 shows a configuration in which the recording/reproduction apparatus or the receiving apparatus having both analog and digital signals in coexistence is connected to a monitor receiver, for example. In FIG. 5, a recording/reproduction apparatus 50, for example, includes a transmission signal source 51 in analog format and a transmission signal source 52 in digital format. Also, the equipment 60 constituting the receiving apparatus described above, for example, includes a signal source 60 for analog transmission and a signal source 62 for digital transmission.

The output signal of the signal source 51 of the equipment 50 is outputted from an output interface (I/F) circuit 53 in analog format and, through a signal line 54, supplied to a first input interface (I/F) circuit 71 in analog format of the equipment 70 making up the aforementioned monitor receiver. Also, the output signal of the signal source 52 of the equipment 50 is output from an input/output interface (I/F) circuit 55 in digital format, and supplied through a bus line 56 to an input/output interface (I/F) circuit 72 in digital format.

Further, the output signal of the signal source 61 of the equipment 60 is outputted from an output interface (I/F) circuit 63 in analog format and, through a signal line 64, supplied to a second input interface (I/F) circuit 73 in analog format. Also, the output signal of the signal source 62 of the equipment 60 is output from an input/output interface (I/F) circuit 65 in digital format, and, through a bus line 66, supplied to an input/output interface (I/F) circuit 54 in digital format of the equipment 50.

In the equipment 70, the signals from the input interface circuits 71, 73 are amplified or otherwise processed in signal processing circuits 74, 75 in analog format, respectively, and supplied to a display/multiplex circuit 76. Also, the signal from the input/output interface circuit 72 is D/A converted or otherwise processed in a signal processing circuit 77 of digital format and supplied to a display/multiplex circuit 76. Further, the signal from an image generating circuit 78 such as "video 1" or "video 2" described above, for example, is supplied to the display-superimposing circuit 76, from which the signal is supplied to a monitor circuit 79.

In this way, a recording/reproduction apparatus or a receiving apparatus in which signals in analog and digital formats coexist are connected to a monitor receiver, for example. In such a case, the interface circuits 53, 71 on the one hand and the interface circuits 63, 73 on the other hand are connected, respectively, in one-to-one relations through the signal lines 54, 64 by an analog signal. By a digital signal, in contrast, the interface circuits 55, 65 and 72 are connected in daisy chain, for example, through bus lines 56, 66.

In the aforementioned equipment 70, the image such as "video 1" or "video 2" generated in the image generating circuit 78 is superimposed on the video signals from the input interface circuits 71, 73, respectively. As a result, as shown in FIG. 6, the operation of the input interface circuits 71, 73, for example, can be displayed on the monitor circuit 79. In the example of FIG. 6 is shown the case where the video signal from the input interface circuits 71, 73 is synthesized in the display-superimposing circuit 76 for what is called a "window display".

Specifically, in the conventional apparatus, in the case where the audio signal or the video signal from the recording/reproduction apparatus or the broadcast receiving apparatus is inputted to and displayed on the monitor receiver, for example, the selection of the input terminal on the monitor receiver is displayed on the monitor tube surface or the like with text such as "video 1" or "video 2". This abstract display, however, requires the user to identify the source apparatus and imposes an extraneous labor on the part of the user.

In the case where a transmission system having a recording/reproduction apparatus or a broadcast receiving apparatus and a monitor receiver in digital format connected with each other through a bus line uses the format prescribed in IEEE1394, for example, the whole system is checked when constructed, so that the name of the manufacturer, the model and the serial number of each unit connected are grasped as a system.

Specifically, a signal indicating the name of the manufacturer, the model, the serial number, etc. of each unit connected to the equipment is transmitted to an equipment providing a reference for system construction, for example. As a result, the recognition code (ID code) described above is set for each of such units. Thus, the reference equipment described above, for example, can know the name of the manufacturer, the model, the serial number, etc. of each unit corresponding to each recognition number (ID).

In the case where the signal in digital format is supplied, the name of the manufacturer, the model, the serial number, etc. of the source apparatus can be determined by detecting the recognition code (source ID) of the particular source apparatus. The name of a manufacturer or the like, however, is normally encoded, and the direct display of such a code is meaningless. Also, only the reference equipment knows of such a name of the manufacturer or the like, but not other equipment can.

Further, in the aforementioned system, the signal in analog format contains no such recognition code of the source equipment as the digital signal described above does, and therefore, when an analog signal is inputted, the name of the manufacturer, etc. cannot be displayed. Also, in the case where the signals in analog and digital formats coexist as in the case described above, the information as to whether the transmission signal is in analog or digital format should also be displayed. Further, transmitting a signal in analog format merely by converting it into a signal in digital format is liable to pose the problem of an increased quantization noise.

A method conceived to cope with this problem consists in the source apparatus transmitting a logo mark indicating the format of the source apparatus and the output signal and superposing it in the display screen of the video signal. In such a method, however, the video signal and the logo mark cannot be separated in the destination apparatus, and a part of the display screen is hidden by the logo mark or the like, resulting in partial failure of the video signal transmission. This may pose another problem under the copyright protection law.

The present application for invention has been proposed in view of these points, and the problem to be solved is the fact that the conventional apparatus lacks the means for accurately displaying such information as from which apparatus the signal on display has come, and the user attempting to know it is unavoidably burdened with an extraneous labor.

In view of this, according to this invention, the information indicating the apparatus and the signal format is formed on the transmitting side, and an image corresponding to the particular information is formed and superimposed on the video signal on the receiving side, whereby the information on the format of the source apparatus and the signal on display can be accurately determined from the image superimposed on the video signal.

BRIEF DESCRIPTION OF THE DRAWINGS

FIG. 4 is a diagram for explaining the same;

FIG. 5 is a block diagram showing a conventional transmission system; and

DESCRIPTION OF THE PREFERRED EMBODIMENTS

Figure 1:
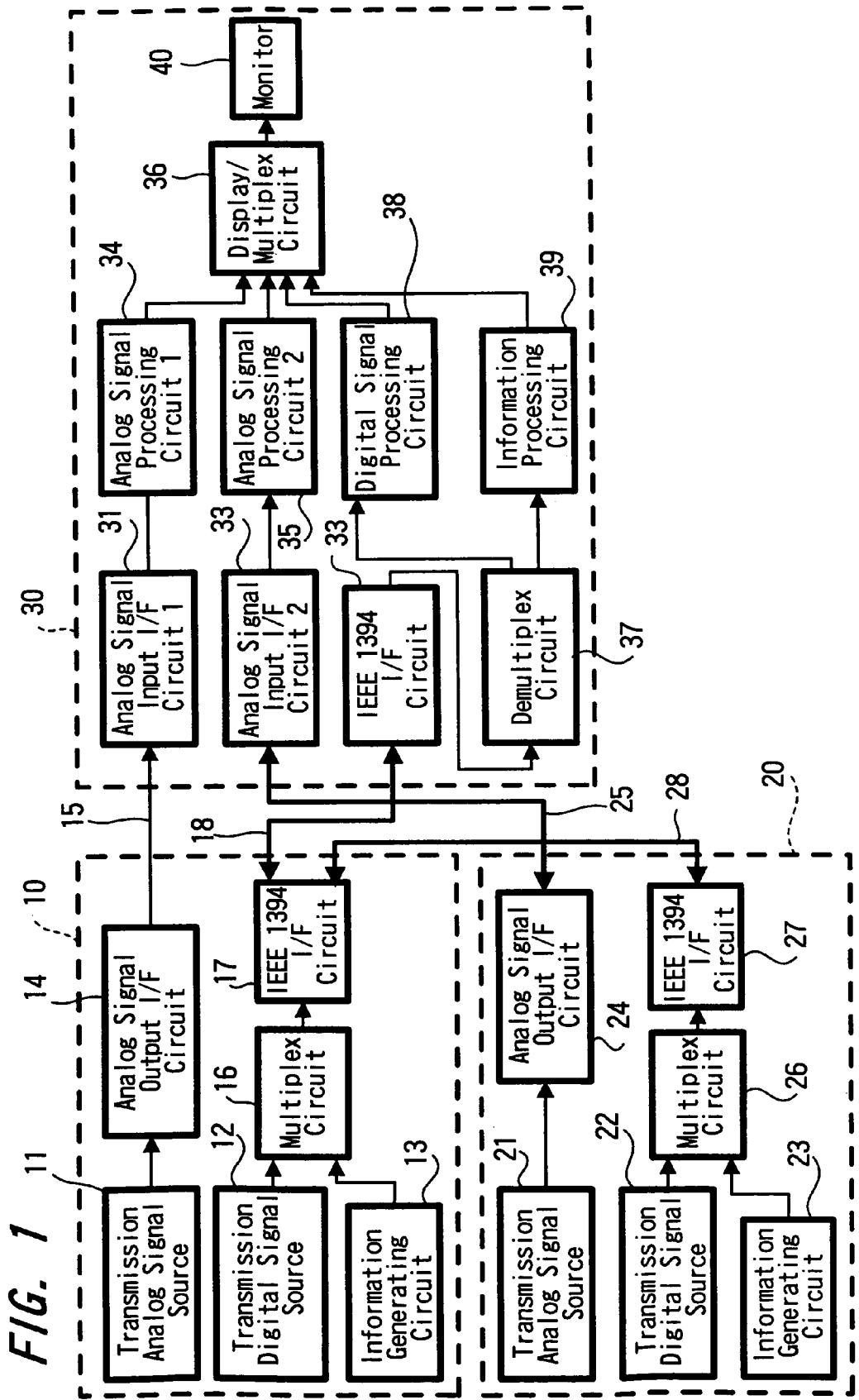
FIG. 1 is a block diagram showing a transmission system according to an embodiment of the present invention.

Specifically, according to a first embodiment of the invention, there is provided a transmission system for transmitting an audio and/or video signal between a transmitting apparatus and a receiving apparatus, comprising one or a plurality of audio and/or video signal transmitting apparatuses each including audio and/or video signal generating means, one or a plurality of analog output means for outputting an audio and/or video signal, and one or a plurality of digital input/output means for inputting/outputting an audio and/or video signal; and an audio and/or video signal receiving apparatus including one or a plurality of analog input means for inputting an audio and/or video signal, one or a plurality of digital input/output means for inputting/outputting an audio and/or video signal, and signal forming means for forming at least a display video signal from the input audio and/or video signal; wherein one or a plurality of the audio and/or video signal transmitting apparatuses each includes information generating means for forming information indicating the format of the apparatus and/or output signal thereof and outputting it from said digital input/output means, and wherein the audio and/or video signal receiving apparatus includes information processing means for superimposing the image corresponding to the input information indicating the format of the apparatus and/or output signal on said display video signal. As a result, the user can transmit the information for accurately knowing, from the image superimposed on the video signal, the information including the apparatus making up the source of the signal on display and the signal.

Also, according to a second embodiment of the invention, there is provided a transmitting apparatus including audio and/or video signal generating means, one or a plurality of analog output means for outputting the audio and/or video signal, and one or a plurality of digital input/output means for inputting/outputting the audio and/or video signal, the system including information generating means for forming information indicating the format of the apparatus and/or output signal and outputting it from said digital input/output means. As a result, the user can transmit the information for knowing, accurately from the image superimposed on the video signal, the information on the apparatus making up the signal source and the format of the signal on display.

Further, according to a third embodiment of the invention, there is provided a receiving apparatus including one or a plurality of analog input means for inputting an audio and/or video signal, one or a plurality of digital input/output means for inputting/outputting an audio and/or video signal, and signal forming means for forming at least a display video signal from the input audio and/or video signal, wherein the information indicating the format of the apparatus and/or transmission signal on the transmitting side is supplied to said digital input/output means, the apparatus further including information processing means for superimposing the image corresponding to the information input from said digital input/output means on said display video signal. As a result, the user can receive and display the information for accurately knowing, from the image superimposed on the video signal, the information on the apparatus making up the signal source and the format of the signal on display.

Now, the present invention will be explained with reference to the drawings. FIG. 1 is a block diagram showing a general configuration of an audio and/or video signal transmission system using a transmitting apparatus and a receiving apparatus according to an embodiment of, the invention.

In FIG. 1, the equipment 10 making up the recording/reproduction apparatus described above includes a source 11 of a signal in analog format for transmission, a source 12 of signal in digital format for transmission, and an information generating circuit 13 for forming the information indicating the format of the particular recording/reproduction apparatus and/or the output signal. The equipment 20 constituting the receiving apparatus described above, on the other hand, includes a source 21 of a signal of analog format for transmission, a source 22 of a signal in digital format for transmission and a information generating circuit 23 for forming the information indicating the format of the particular receiving apparatus and the output signal.

The output signal of the signal source 11 of the equipment 10 is outputted from an output interface (I/F) circuit 14 in analog format, and through a signal line 15, supplied to a first input interface (I/F) circuit 31 in analog format of the equipment 30 constituting the monitor receiver described above, for example. Also, the output signal of the signal source 12 of the equipment 10 and the output signal of the information generating circuit 13 are synthesized in a multiplex circuit 16, and the resulting synthesis signal is output from an input/output interface (I/F) circuit 17 in digital format, and through a bus line 18, supplied to an input/output interface (I/F) circuit 32 in digital format of the equipment 30.

Further, the output signal of the signal source 21 of the equipment 20 is outputted from an output interface (I/F) circuit 24 in analog format, and through a signal line 25, supplied to a second input interface (I/F) circuit 33 in analog format of the equipment 30. Also, the output signal of the signal source 22 of the equipment 20 and the output signal of the information generating circuit 23 are synthesized in a multiplex circuit 26, and the resulting synthesis signal is output from an input/output interface (I/F) circuit 27 in digital format, and through a bus line 28, supplied to an input/output interface (I/F) circuit 17 of the equipment 10.

In the equipment 30, the signals from the input interface circuits 31, 33 are amplified or otherwise processed as predetermined in the signal processing circuits 34, 35 in analog format, and then supplied to the display superimposing circuit 36. Also, the signal from the input/output interface circuit 32 is supplied to the demultiplex circuit 37, and the signals corresponding to the output signals of the separate signal sources 12, 22 are D/A converted or otherwise processed in the signal processing circuit 38 in digital format, followed by being supplied to the display superimposing circuit 36.

Also, the signal corresponding to the output signals of the information generating circuits 13, 23. separated by the demultiplex circuit 37 are supplied to the information processing circuit 39. In this information processing circuit 39, the information indicating the format of the apparatus and/or the output signal formed in the information generating circuits 13, 23 are detected, and images are formed corresponding to the respective information. The signals from this information processing circuit 39 are supplied to the display superimposing circuit 36, and from this display superimposing circuit 36, supplied to the monitor circuit 40.

In this way, the recording/reproduction apparatus or the receiving apparatus in which the signals in analog and digital formats coexist are connected to a monitor receiver, for example. In this case, with a signal in analog format, the interface circuits 14, 31 and the interface circuits 24, 33 are connected in one-to-one relations, respectively, through the signal lines 15, 25, respectively. Also, with a signal in digital format, the interface circuits 17, 27, 32 are connected in daisy chain, for example, through bus lines 18, 28.

Further, in the transmission system described above, assuming that the interface circuits 17, 27, 32 are connected using the format prescribed in IEEE1394 described above, for example, the signals in digital format from the signal sources 12, 22 are transmitted in isochronous packets. At the same time, the information from the information generating circuits 13, 23 are transmitted in asynchronous packets configured to write the control information (data) of one quadlet or at least one quadlet in the desired memory or register of an arbitrary apparatus.

Figure 2:
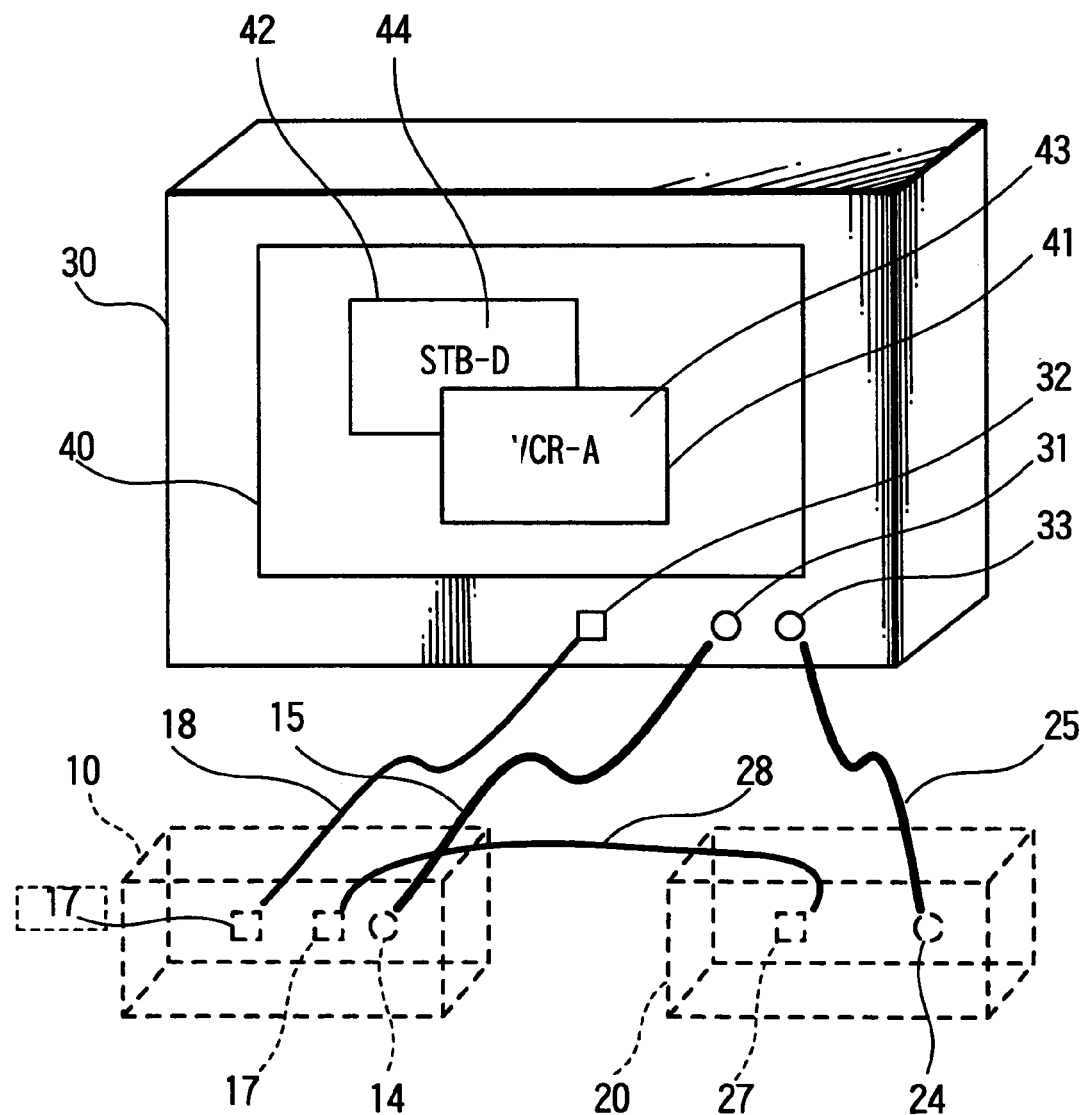
FIG. 2 is a configuration diagram showing the whole apparatus.
Figure 3:
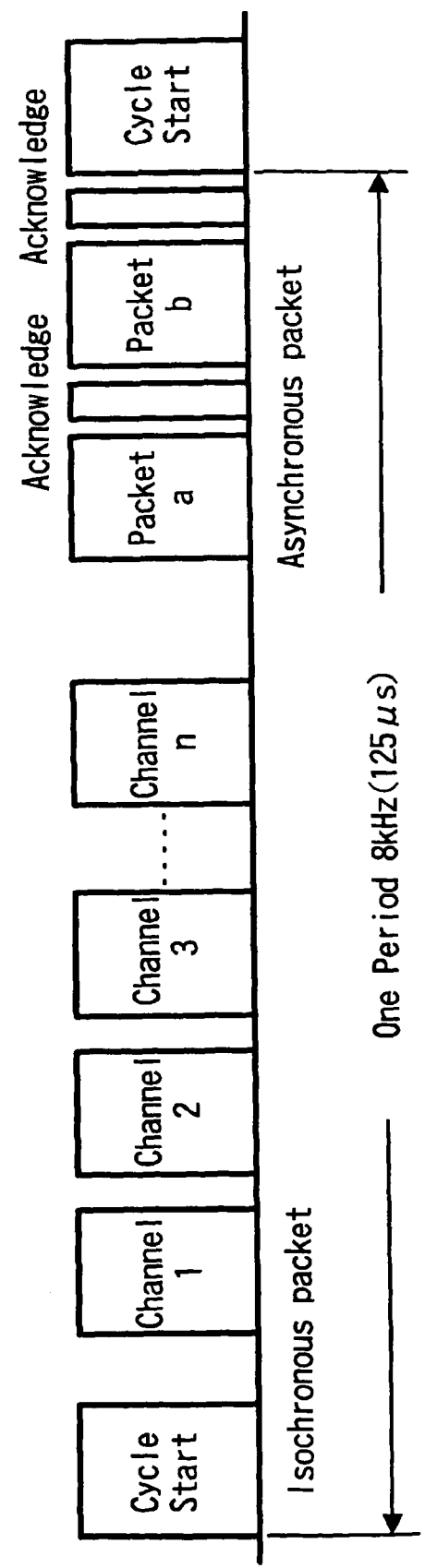
FIG. 3 is a diagram for explaining IEEE1394.
Figure 6:
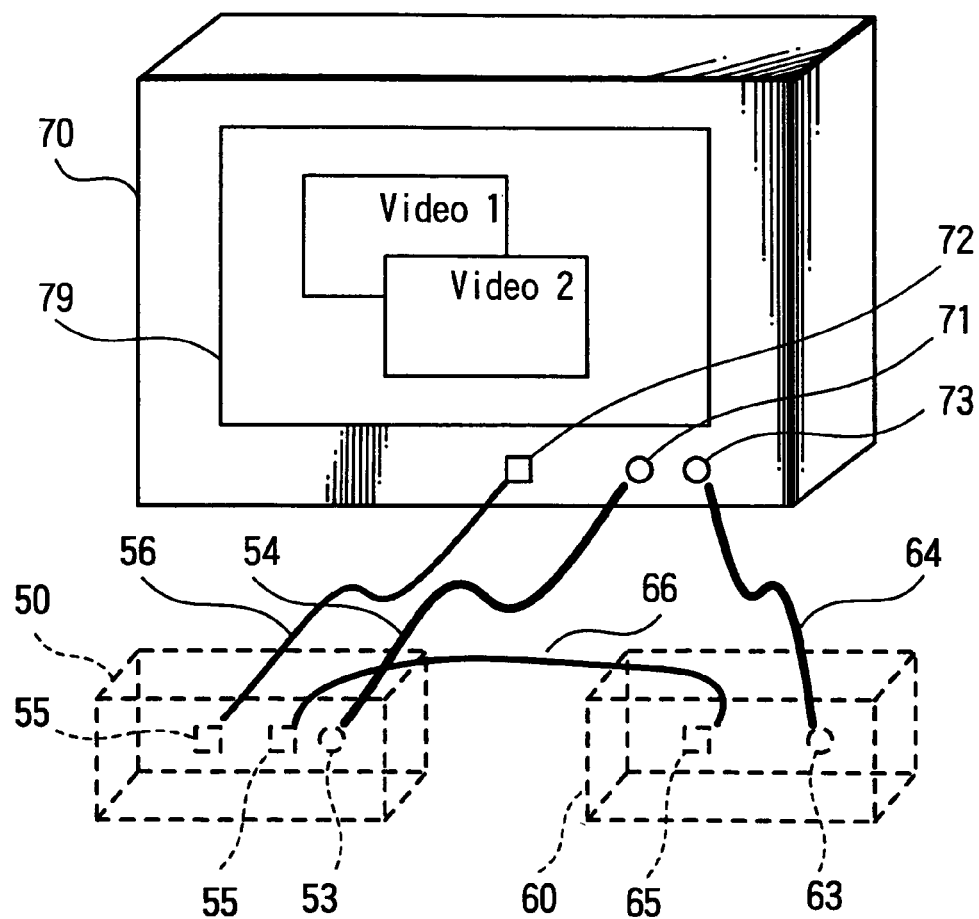
FIG. 6 is a diagram showing a configuration of the whole system.

As a result, the display as shown in FIG. 2, for example, appears on the monitor circuit 40 of the equipment 30. Specifically, with regard to the information indicating the format of the apparatus and/or the output signal from the information generating circuit 13 of the equipment 10 constituting the recording/reproduction apparatus described above, for example, the characters "VCR" indicating that the equipment 10 is the recording/reproduction apparatus and the character "–A" designated by 43 indicating that the video signal is an analog signal, for example, are formed by the information processing circuit 39 and multiplexed in the screen 41 of the video signal from the equipment 10.

Also, with regard to the information indicating the format of the apparatus and/or the output signal from the information generating circuit 23 of the equipment 20 constituting the receiving apparatus described above, for example, the characters "STB" indicating that the equipment 20 is the receiving apparatus and the character "–D" designated by 44 indicating that the video signal is in digital format are formed by the information processing circuit 39 and multiplexed in the screen 42 of the video signal from the equipment 20. In the case of FIG. 2, for example, the video signals from the input interface circuits 31, 32 are synthesized in the display superimposing circuit 36 for what is called the window display.

In the transmission system described above, the image specifically indicating the format of the apparatus and/or output signal is formed in the screen of each video signal, and therefore the user can accurately grasp the format of the apparatus and the video signal displayed. It is thus possible to eliminate the extraneous labor used for determination thereof.

Also, in the transmission system described above, even in the case where the output signals of the signal sources 11, 12 are supplied to the equipment 30 through the signal lines 15, 25, the output signals of the information generating circuits 13, 23 are supplied to the equipment 30 at the same time through the bus line 18. Therefore, when these information generating circuits 13, 23 form the information indicating that the format of the apparatus concerned and the output signals is analog in format, then like in the foregoing case, the characters "VCR" to indicate that the equipment 10 is the recording/reproduction apparatus and the character "–A" designated by 43 in the case where the video signal is in analog format are displayed on the monitor circuit 40. As a result, the desired display can be effected also at the time of inputting the signal of analog format.

Further, in the transmission system described above, the information indicating the format of the apparatus and/or the output signal of the information generating circuit 13, 23 supplied through the bus line 18 is encoded and transmitted. At the same time, a comparison table for identifying the format of the apparatus and/or output signal for the code is included in the information processing circuit 39 of the equipment 30, and thereby an image is formed which specifically shows the format of the apparatus and/or the output signal identified in the comparison table. The code transmitted in this is the information of one quadlet, for example, in which case the control information of one quadlet prescribed in IEEE1394 described above can be easily transmitted using the format of the asynchronous packet for writing the control information in the desired memory or register.

Further, in the transmission system described above, the image specifically showing the format of the apparatus and/or output signal on display can be displayed in arbitrary logo characters as well as the text image described above. As a result, the name of the equipment manufacturer can be displayed with a logo character such as the mark of the company or the recording/reproduction apparatus can be displayed in a figure or the like easy to recognize.

Also, such a logo character can be included in the information processing circuit 39 of the equipment 30 with the comparison table described above, for example. Such a logo character, however, can be formed as bit map data and transmitted using the format of the asynchronous packet for writing the control information of one quadlet or at least one quadlet prescribed by IEEE1394 described above in an arbitrary apparatus. In such a case, the bit map data of such a logo character is included in the information generating circuits 13, 23 of the equipment 10, 20 thereby making it possible to display the above-mentioned image without providing the comparison table or the image data in the information processing circuit 39 of the equipment 30.

Further, in the transmission system described above, what is called the window display of the video signals from the input interface circuits 31, 32, for example, is made possible by synthesizing them in the display superimposing circuit 36. Also, in the case where the aforementioned signal is connected by use of the format prescribed in IEEE1394, for example, the signal of digital format from the signal sources 12, 22 can be transmitted in an isochronous packet, while the information from the information generating circuits 13, 23 can be transmitted in a configuration of an asynchronous packet for writing the control information (data) of one quadlet or at least one quadlet in the desired memory or register of an arbitrary apparatus.

Thus, in this audio and/or video signal transmission system, or a transmitting apparatus or a receiving apparatus thereof, the information indicating the format of the apparatus and the signal are formed on the transmitting side, while the image corresponding to this information is formed and superimposed on the video signal on the receiving side. In this way, the information on the format of the apparatus providing the source of the signal on display, for example, can be accurately determined by the image superimposed on the video signal.

As a result, unlike in the prior art apparatus lacking the means for accurately displaying the information such as from which apparatus the signal on display is derived and which requires an extraneous labor on the part of the user for determining it, these problems can be easily solved according to the invention.

By the way, the present invention is not limited to the embodiments described above, but can be modified variously without departing from the spirit of the invention.

Thus, according to an embodiment of the invention, the information indicating the format of the apparatus and the signal are formed on the transmitting side, and the image corresponding to this information is formed and superimposed on the video signal on the receiving side. In this way, it is possible to transmit the information by which the user can accurately know the information on the format of the apparatus and the signal of the signal source on display, for example, by the image superimposed on the video signal.

As a result, unlike the conventional apparatus lacking means for accurately displaying the information on the apparatus from which the signal on display is derived and imposing an extraneous labor on the user, the present invention can solve these problems easily.

Also, according to an embodiment of the invention, the information generating means transmits by forming the information indicating the format of the apparatus and/or output signal, and the information processing means determines the format of the apparatus involved and/or the output signal in accordance with a preset comparison table having a transmitted code and superimposes an image on the video signal for display. Thus, the code to be transmitted can be constructed as information of one quadlet, for example, and therefore can be easily transmitted.

Also, according to an embodiment of the invention, the information generating means forms and transmits the information indicating the format of the apparatus involved and/or the output signal with an arbitrary logo character, and the information processing means receives and superimposes the transmitted character on the video signal for display, thus permitting it to display the recording/reproduction apparatus and the receiving apparatus with a pattern or the like easy to recognize.

Also, according to an embodiment of the present invention, a logo character is formed and transmitted in the bit map data format, and therefore even when the comparison table or the image data are lacking on the part of the equipment for display, the image described above can be displayed.

Also, according to an embodiment of the invention, window synthesis means is provided for synthesizing the video signal superimposed with an image using a plurality of windows, so that what is called the window display of these video signals is made possible.

Also, according to an embodiment of the invention, the information indicating the format of the audio and/or video signal in the digital input/output means and the apparatus involved and/or the output signal can be transmitted using the format prescribed in IEEE1394. Thus, the signal in digital format is transmitted in an isochronous packet, while the information from the information generating circuit can be transformed with a configuration of an asynchronous packet in which the control information (data) of one quadlet or at least one quadlet are written in the desired memory or register of an arbitrary apparatus.

Further, according to an embodiment of the invention, the information indicating the format of the apparatus and signal is formed on the transmitting side, and an image corresponding to this information is formed and superimposed on the video signal on the receiving side. In this way, it is possible to transmit the information so that the user can accurately know the information including the format of the apparatus of the signal source and the signal on display from the image superimposed on the video signal.

Also, according to an embodiment of the invention, the information generating means can convert the transmitted code into information of, say, one quadlet by forming the information indicating the format of the apparatus involved and/or the output signal in a predetermined code, and thus can easily transit this code.

Also, according to an embodiment of the invention, the information generating means can transmit the information for displaying the recording/reproduction apparatus and the receiving apparatus in a pattern or the like easy to recognize, by forming the information indicating the format of the apparatus involved and/or the output signal in an arbitrary logo character.

Also, according to an embodiment of the invention, a logo character is transmitted by being formed in bit map data format, whereby the aforementioned information for displaying the image can be transmitted without any comparison table or image data on the display equipment.

Also, according to an embodiment of the invention, the information indicating the format of the audio and/or video signal in the digital input/output means and the information indicating the apparatus involved and/or the output signal are transmitted in the format prescribed by IEEE1394. Therefore, the signal in digital format can be transmitted in isochronous packets, and the information from the information generating circuit can be transmitted with a configuration in which the control information (data) of one quadlet or at least one quadlet are written in the desired memory or register of an arbitrary apparatus.

Further, according to an embodiment of the invention, the information indicating the format of the apparatus involved and the signal is formed on the transmitting side, and an image corresponding to this information is formed and superimposed on the video signal on the receiving side. In this way, it is possible to receive and display the information required by the user to accurately know the information including the format of the apparatus of the signal source and the signal on display, for example, by the image superimposed on the video signal.

Also, according to an embodiment of the invention, the information supplied to the digital input/output means is formed by a predetermined code, and the information processing means determines the format of the apparatus and/or the transmission signal on the transmitting side in accordance with the comparison table prepared in advance and superposes the image on the video signal for display. In this way, the code transmitted can be converted into the information of, say, one quadlet and can be easily transmitted.

Also, according to an embodiment of the invention, the information supplied to the digital input/output means is transmitted by being formed with an arbitrary logo character, and the transmitted logo character is received and superimposed on the video signal for display. In this way, the recording/reproduction apparatus and the receiving apparatus can be displayed in a pattern easy to recognize.

Also, according to an embodiment of the invention, a logo character is transmitted by being formed in the bit map data format thereby to display the above-mentioned image without providing a comparison table or image data on the part of the display equipment.

According to an embodiment of the invention, on the other hand, for each of a plurality of received video signals, the image is superimposed on the video signal for display corresponding to the information indicating the format of the apparatus and/or the transmission signal on the transmitting side, while at the same time synthesizing the video signal with the image signal superimposed thereon by use of a plurality of windows. In this way, what is called the window display of such a video signal is made possible.

Also, according to an embodiment of the invention, the information indicating the audio and/or video signal in the digital input/output means and the format of the apparatus and/or the transmission signal on the transmitting side are transmitted using a format in IEEE1394. Thus, the signal in digital format is transmitted in isochronous packets and the information from the information generating circuit can be transmitted with a configuration of asynchronous packets for writing the control information (data) of one quadlet or at least one quadlet in the desired memory or register of an arbitrary apparatus.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. An audio and/or video signal transmission system for transmitting an audio and/or video signal between a transmitting peripheral apparatus and a receiving apparatus, the system comprising:

the audio and/or video signal transmitting peripheral apparatus including analog audio and/or video signal generating means for generating an analog audio and/or video signal, digital audio and/or video signal generating means for generating a digital audio and/or video signal, analog output means for outputting said analog audio and/or video signal, information generating means for generating a digital information signal containing information identifying a type of said transmitting peripheral apparatus and an equipment brand name of said transmitting peripheral apparatus and indicating a format type of said analog audio and/or video signal or said digital audio and/or video signal, a multiplexing circuit for multiplexing the digital information signal and the digital audio and/or video signal and producing a multiplexed digital signal, and a digital input/output means for inputting/outputting said multiplexed digital signal, and the audio and/or video signal receiving apparatus including a plurality of analog input means for inputting an analog audio and/or video signal from the analog output means, digital input/output means for inputting/outputting the multiplexed digital signal to/from the digital input/output means of said transmitting peripheral apparatus, a demultiplexing circuit for demultiplexing an output of said digital input/output means and producing a first output of said digital information signal and a second output of said digital audio and/or video signal, wherein the audio and/or video signal transmitting peripheral apparatus is operable to (a) asynchronously transmit the information identifying the type of said transmitting peripheral apparatus and the equipment brand name of said transmitting peripheral apparatus and (b) to isochronously transmit said digital audio and/or video signal, based on synthesizing said digital audio and/or video signal and the information identifying the type of said transmitting peripheral apparatus and the equipment brand name of said transmitting peripheral apparatus in said multiplexing circuit, and wherein the transmitting peripheral apparatus is connected to the receiving apparatus, and the format type selectively indicates analog signal and digital signal;

wherein said audio and/or video signal receiving apparatus further includes:

information processing means receiving the first output from said demultiplexing circuit for generating an image signal therefrom for use in displaying the type of the audio and/or video signal transmitting peripheral apparatus, the equipment brand name of the peripheral apparatus and the format type of the output video signal from the audio and/or video signal transmitting peripheral apparatus, wherein the type of the audio and/or video signal transmitting peripheral apparatus, the equipment brand name of the transmitting peripheral apparatus and the format type are indicated by respective predetermined characters or by a logo, signal forming means for forming a display video signal from said analog audio and/or video signal from said analog input means, and/or from said digital audio and/or video signal from said demultiplexing means, and means for superimposing the image signal on the display video signal, so that when displayed the predetermined characters or logo are superimposed on a displayed image such that a user can view the type of the audio and/or video signal transmitting peripheral apparatus, the equipment brand name and the format type pertaining to the display video signal currently being displayed at the time the display video signal is displayed.

2. The audio and/or video signal transmission system as claimed in claim 1, wherein said information generating means forms and transmits information indicating the format of said apparatus and/or output signal according to a predetermined code, and said information processing means determines the format of said apparatus and/or output signal in accordance with a comparison table containing a plurality of codes for superimposing said image in said video image.

3. The audio and/or video signal transmission system as claimed in claim 1, wherein said logo is transmitted by being formed in a bit map format.

4. The audio and/or audio video signal transmission system as claimed in claim 1, wherein said audio and/or video signal receiving apparatus superimposes said image on said display video signal corresponding to the information identifying said transmitting peripheral apparatus and indicating the format type of the video signals transmitted from said audio and/or video signal transmitting peripheral apparatus, and said system further comprising window synthesis means for synthesizing said video signal with said image superimposed thereon using a plurality of windows.

5. The audio and/or video signal transmission system as claimed in claim 1, wherein said audio and/or video signal and said information indicating the format of said apparatus and/or output signal in said digital input/output means are transmitted using a format specified in IEEE1394.

6. An audio and/or video signal transmitting peripheral apparatus comprising:

analog audio and/or video signal generating means;

analog output means for outputting said analog audio and/or video signal;

digital audio and/or video signal generating means for generating a digital audio and/or video signal;

information generating means for generating a digital information signal including information identifying a type of said transmitting peripheral apparatus and an equipment brand name of said transmitting peripheral apparatus and indicating a format of an output signal supplied from the apparatus, wherein the transmitting peripheral apparatus is connectable with a receiving apparatus, and the format type can indicate analog signal and digital signal;

a multiplexing circuit for multiplexing said digital audio and/or video signal and the digital information signal and producing a multiplexed digital signal; and digital input/output means for outputting the multiplexed digital signal from the multiplexing circuit, in which said transmitting peripheral apparatus is operable (a) to asynchronously transmit the information identifying the type of said transmitting peripheral apparatus and the equipment brand name of said transmitting peripheral apparatus and (b) to isochronously transmit said digital audio and/or video signal, based on synthesizing said digital audio and/or video signal and the information identifying the type of said transmitting peripheral apparatus and the equipment brand name of said transmitting peripheral apparatus in said multiplexing circuit.

7. The audio and/or video transmitting peripheral apparatus as claimed in claim 6, wherein said information generating means forms said information indicating the format of said output signal according to a predetermined code.

8. The audio and/or video transmitting peripheral apparatus as claimed in claim 6, wherein said information generating means forms said information identifying the type of said transmitting peripheral apparatus and indicating the format of said output signal according to a predetermined logo character.

9. The audio and/or video transmitting peripheral apparatus as claimed in claim 8, wherein said logo character is formed and transmitted in a bit map data format.

10. The audio and/or video transmitting peripheral apparatus as claimed in claim 6, wherein said audio and/or video signal and said information identifying the type of said transmitting peripheral apparatus and indicating the format of said output signal from said digital input/output means are transmitted using a format specified in IEEE1394.

11. An audio and/or video signal monitor/receiver receiving an audio and/or video signal from a transmitting peripheral apparatus including a receiver and a recording/reproducing apparatus, comprising:

a plurality of analog input means for respectively inputting analog audio and/or video signals from the transmitting peripheral apparatus;

a digital input/output means for inputting/outputting a digital audio and/or video signal multiplexed with a digital information signal originating from a transmitting peripheral apparatus identifying a type of the transmitting peripheral apparatus and an equipment brand name of the transmitting peripheral apparatus and indicating a format of the digital audio and/or video signal fed thereto;

a demultiplexing circuit for separating said digital information signal from the input digital audio and/or video signal fed to said digital input/output means and producing a first output of said digital information signal and a second output of said digital audio and/or video signal; and information processing means receiving the first output from said demultiplexing circuit for generating an image signal therefrom for use in displaying the type of the transmitting apparatus and the equipment brand name of said transmitting peripheral apparatus and indicating the format of the video signal from the transmitting peripheral apparatus, wherein the type of the transmitting peripheral apparatus and the format type are indicated by letter characters;

signal forming means for forming a display video signal from said analog audio and/or video signal from said audio input means, and/or from digital audio and/or video signal from said demultiplexing circuit; and means for superimposing the image signal on the display video signal, so that when displayed the letter characters are superimposed on a displayed image such that a user can view the type of the transmitting peripheral apparatus, the equipment brand name of the transmitting peripheral apparatus and the format pertaining to the display video signal currently being displayed at the time the display video signal is displayed, wherein said demultiplexing circuit is operable to separate signals from said transmitting peripheral apparatus that is operable to asynchronously transmit the signal identifying the type of said transmitting peripheral apparatus and the equipment brand name of the transmitting peripheral apparatus and (b) to isochronously transmit said digital audio and/or video signal, based on synthesizing said digital audio and/or video signal and the information identifying the type of said transmitting peripheral apparatus and the equipment brand name of said transmitting peripheral apparatus in a multiplexing circuit, wherein the transmitting peripheral apparatus is connectable with the receiver, and the format type selectively indicates analog signal and digital signal.

12. The audio and/or video monitor/receiver as claimed in claim 11, wherein the information supplied to said digital input/output means is formed by a predetermined code, and the superimposing means superimposes said image on said display video signal by determining a format of said apparatus and/or transmission signal at the transmitting end according to a comparison table having said predetermined code preset therein.

13. The audio and/or video monitor/receiver as claimed in claim 11, wherein the information supplied to said digital input/output means is formed and transmitted with a predetermined logo character, and said transmitted logo character is received and superimposed on said display video signal.

14. The audio and/or video monitor/receiver as claimed in claim 13, wherein said logo character is formed and transmitted in a bit map data format.

15. The audio and/or video monitor/receiver as claimed in claim 11, wherein said image is superimposed on said display video signal corresponding to the format of said apparatus and/or transmission signal at said transmitting end for each of a plurality of said received video signals, and the apparatus further comprises window synthesis means for synthesizing said video signal with said image superimposed thereon using a plurality of windows.

16. The audio and/or video monitor/receiver as claimed in claim 11, wherein the format of said audio and/or video signal in said digital input/output means and said apparatus and/or transmission signal at the transmitting end are transmitted using a format specified in IEEE1394.

17. The audio and/or video signal transmission system as claimed in claim 1, in which the audio and/or video signal transmitting peripheral apparatus is operable to isochronously transmit the digital audio and/or video signal.

18. The audio and/or video transmitting peripheral apparatus as claimed in claim 6, in which the audio and/or video signal transmitting peripheral apparatus is operable to isochronously transmit the digital audio and/or video signal.

19. The audio and/or video monitor/receiver as claimed in claim 11, in which the transmitting peripheral apparatus is operable to isochronously transmit the digital audio and/or video signal.

20. The audio and/or video signal transmission system of claim 1 wherein a superimposed display video signal from the means for superimposing the image signal inputted through the digital input/output means on the display video signal includes a signal from the analog input means.

21. The audio and/or video signal monitor/receiver of claim 11 wherein a superimposed display video signal from the means for superimposing the image signal inputted through the digital input/output means on the display video signal includes a signal from the analog input means.

* * * * *